W. A. SCHMIDT.
PROCESS AND APPARATUS FOR COLLECTING SUSPENDED MATERIAL FROM FURNACE GASES.
APPLICATION FILED AUG. 9, 1918.
1,413,877.
Patented Apr. 25, 1922.
3 SHEETS—SHEET 1.
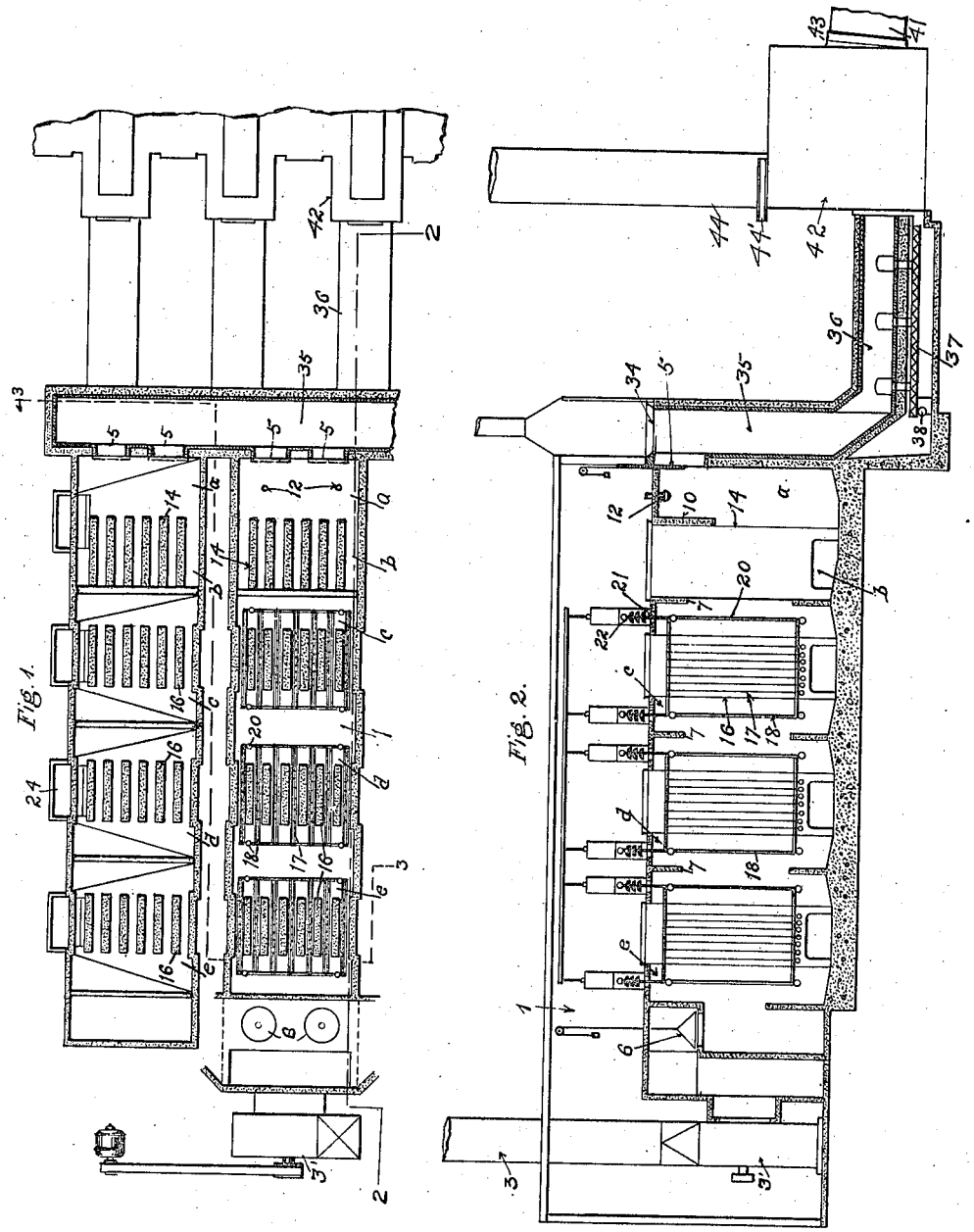
INVENTOR
Walter A. Schmidt
BY
Arthur P. Knight
ATTORNEY

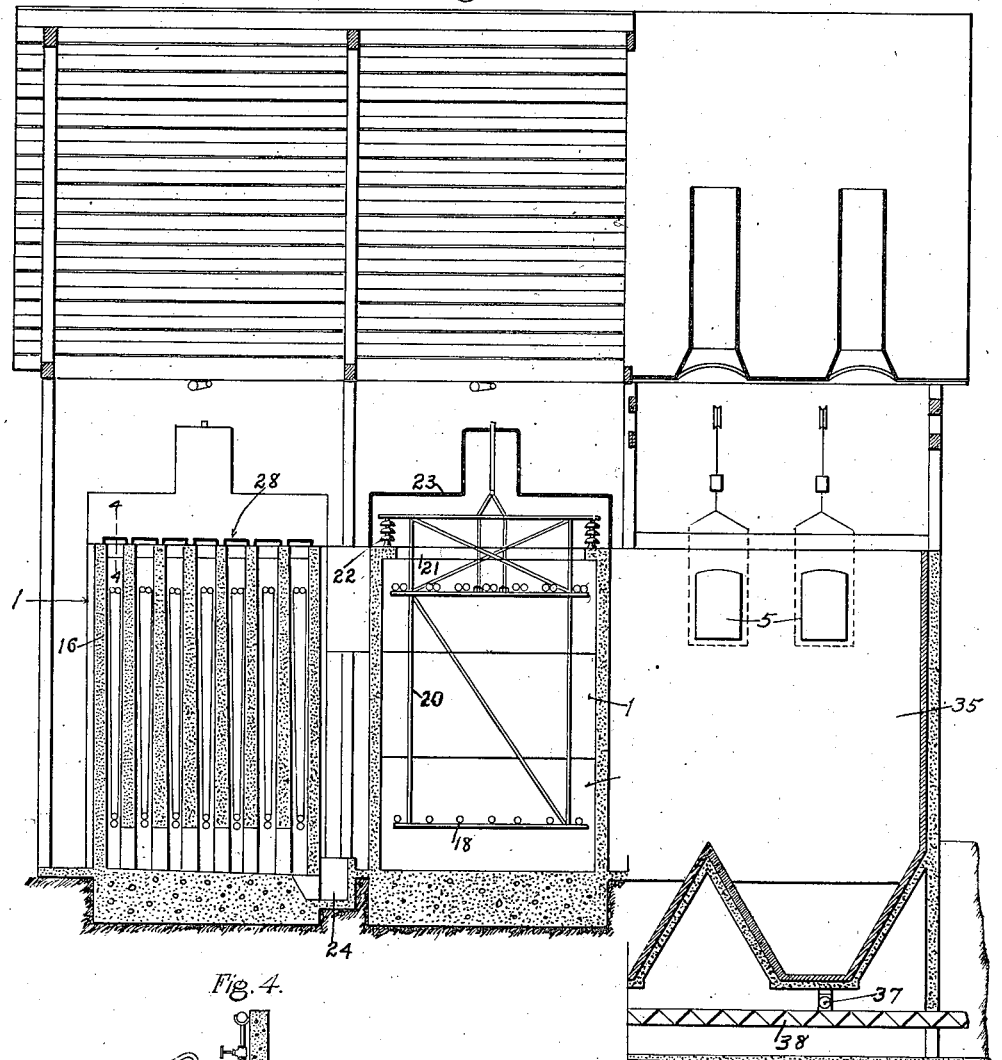
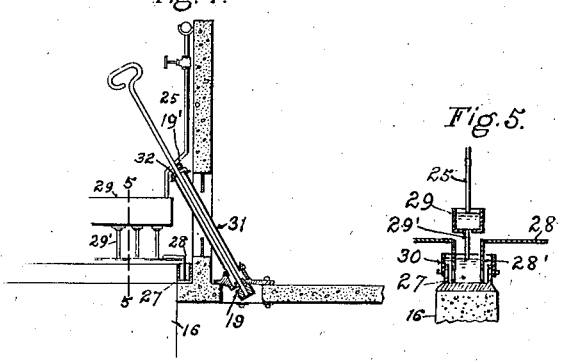
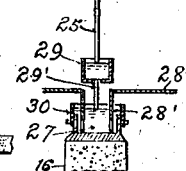

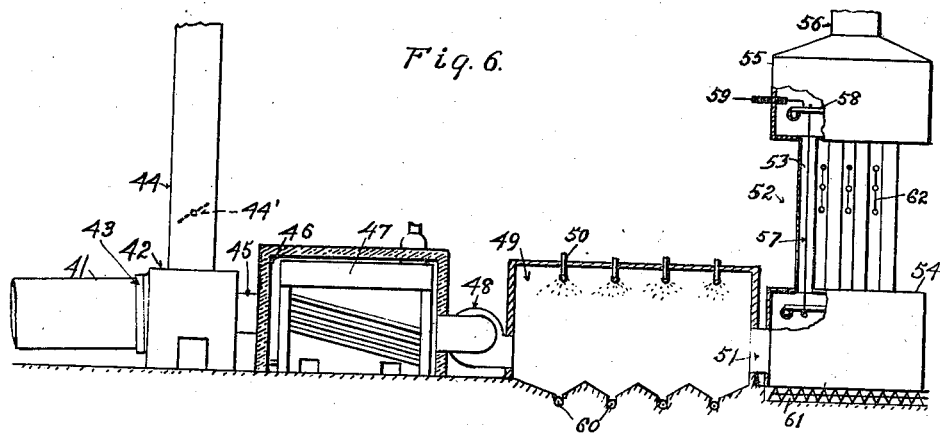
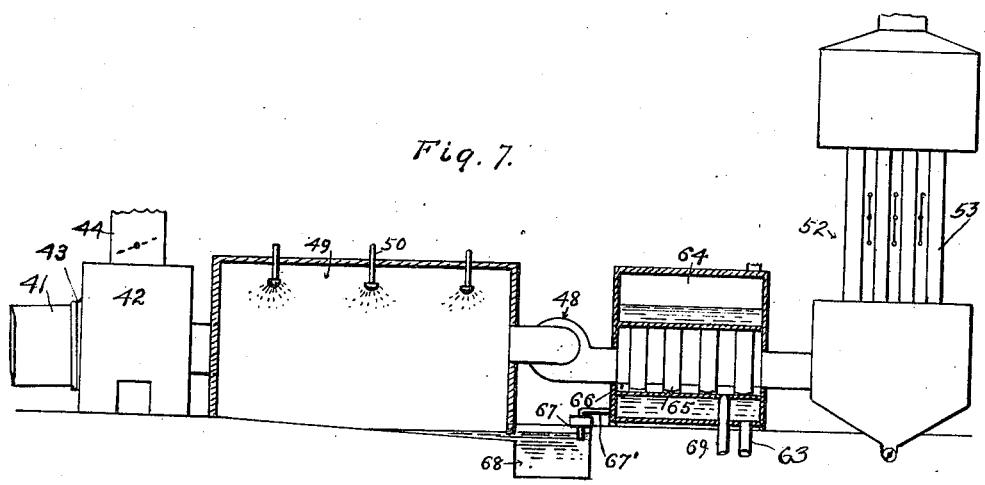
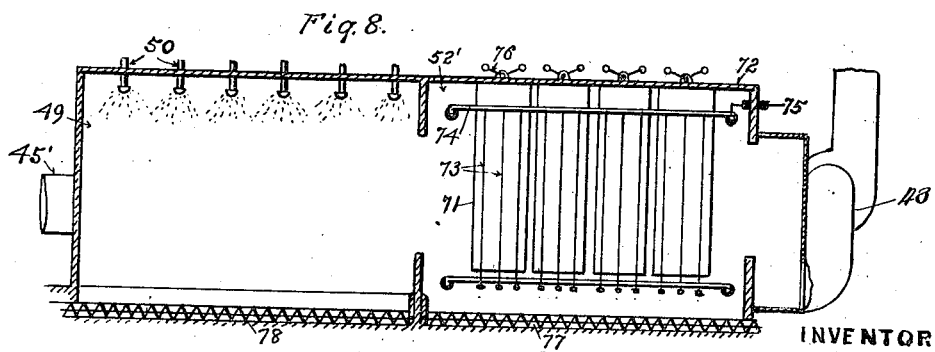

UNITED STATES PATENT OFFICE.

WALTER A. SCHMIDT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS AND APPARATUS FOR COLLECTING SUSPENDED MATERIAL FROM FURNACE GASES.

1,413,877.   Specification of Letters Patent.   Patented Apr. 25, 1922.

Application filed August 9, 1918. Serial No. 249,147.

*To all whom it may concern:*

Be it known that I, WALTER A. SCHMIDT, a citizen of the United States, residing at Los Angeles, in the county of Los Angeles and State of California, have invented a new and useful Process and Apparatus for Collecting Suspended Material from Furnace Gases, of which the following is a specification.

This invention relates to electrical preciptation of suspended material from furnace gases. In the operation of electrical precipitating apparatus it has been found in practice that under some conditions the efficiency cannot be maintained at a maximum, this being particularly the case where the gases are hot and where the suspended material is of a dry non-conductive nature. The main object of the present invention is to provide an apparatus which will operate with high efficiency in the treatment of gases of this character, and at the same time will provide for removal or collection of coarse dust from the furnace gases before the gases with the finer fumes contained therein are passed to the electrical precipitating apparatus, so as to recover the fume constituents by electrical precipitation, substantially free from the coarse dust. An important advantage of this mode of operation is that such finer fume constituents are generally of different composition from the coarser dust and a separation of different materials carried by the furnace gases is thereby effected.

Another object of the invention is to cool the hot furnace gases before they are subjected to electrical precipitation, so as to increase the efficiency of operation by reason of decreased volume and velocity of the gases in passing through the precipitator. An important advantage of this mode of operation is that liability of dangerous flames or explosions due to presence of unconsumed hot combustible gases or to presence of combustible dust, is avoided by cooling the gases below ignition point, or sufficiently humidifying the gases to prevent flame propagation, or by wetting the dust and thereby rendering it non-explosive. This last point is of especial importance in connection with electrical precipitation as the occasional sparks, or disruptive discharges, produced unavoidably in the operation of an electrical precipitator would be liable to cause ignition of an explosive mixture of combustible dust and air.

In applying my invention to the treatment of hot gases (such as cement kiln gases or smelter gases) containing fume or fume forming constituents and also containing relatively coarse dust, I spray or distribute water into the gases so as to cool and humidify the gases and also to wash out or separate part or all of the dust or coarse suspended material, and I then pass the gases through an electrical precipitator to precipitate and collect the fume or finer suspended material by electrical action. The operation may be so carried out as to precipitate the fume in dry condition or, if considered preferable, the fume may be collected in liquid. I prefer to so carry out the process that the volume of the gas is maintained as small as practicable, at each stage of the operation, thereby decreasing the velocity through the apparatus and consequently increasing the efficiency of the separating operation; this object I attain by eliminating, as far as possible, leakage of outside air into the gases, and by cooling the gases so as to reduce the volume thereof, and by using forced draft, if necessary, to provide for free flow of the gases through the apparatus, so that the heat of the gases is not depended on for maintaining such flow.

The accompanying drawings illustrate apparatus suitable for carrying out my invention, and referring thereto:

Fig. 1 is a horizontal section of one form of such apparatus adapted for collecting the fume in liquid solution the discharge electrode having been omitted in the upper precipitating chamber; Fig. 2 is a vertical section thereof on plane 2—2 of Fig. 1; Fig. 3 is a section taken on an arbitrary plane showing the different sections through two of the precipitating chambers and a third section through the vertical flue on line 3—3 in Fig. 1; Fig. 4 is a section on line 4—4 in Fig. 3; Fig. 5 is a section on line 5—5 in Fig. 4; Fig. 6 is a vertical section partly in elevation of another form of apparatus suitable for carrying out the invention in such manner as to collect the fume in dry condition; Figs. 7 and 8 are partly sectional side elevations of modified forms of the apparatus adapted for collection of the fume in dry condition.

The electrical precipitator or treater may be arranged in any desired number of units, each unit, as shown in Figs. 1 to 5 of the drawings, comprising a chamber or flue 1 connected at one end to means for delivering hot furnace gases thereto, and at the other end to a stack or outlet flue 3. The flue 1 may be connected to receive effluent gases from any furnace; for example, a cement kiln or a smelting furnace, a cement kiln being indicated at 41 in the drawing connected to the flue 1, as hereinafter set forth. The chamber or flue 1 is shown as extending horizontally, but it will be understood that if desired it may be inclined or the several parts thereof may be at different levels. Dampers 5 may be provided at the inlet of this flue and dampers 6 at the outlet thereof, for controlling the rate of flow of gases through said flue. A series of partition walls or curtains 7 may extend from the roof of said flue so as to divide the flue space into a series of chambers "$b$," "$c$," "$d$" and "$e$" and a preliminary chamber "$a$" may be provided between the inlet dampers 5 and the chamber "$b$," by a separating partition 10 extending part way down from the roof of the flue.

The preliminary chamber "$a$" may be provided with means, such as nozzles 12, whereby water or solution may be sprayed into the gases passing through said chamber. The chamber "$b$" constitutes a cooling and humidifying chamber and is provided with a series of vertical walls or plates 14 extending the full height of the chamber and provided with means whereby water or solution is supplied to said walls or plates so that a continuous stream or film of water is maintained on the surfaces of said walls or plates 14. Only one of said humidifying and cooling chambers "$b$" is shown, but it will be understood that there may be any desired number of same. The chambers "$c$," "$d$" and "$e$" through which the gases pass successively after leaving the humidifying and cooling chamber "$b$" are provided with means for maintaining an electrical field through which the gases pass in order to produce electrical precipitation of suspended material. Any suitable electrode means may be used for this purpose, comprising discharge electrodes 17 and collecting electrodes 16. The collecting electrodes 16 may consist of vertical walls or plates extending the full height of the chambers "$b$," "$c$," etc., and provided with means for maintaining a flow of water or solution over the surfaces thereof. The discharge electrodes may consist of vertical wires strung in a frame 18 including vertical bars 20, extending upwardly through openings 21 into the top of the flue 1 and being supported by insulators 22 in insulator boxes 23 above said flue. Manually operated hammers 19 extending through the side wall may be provided for striking the frame 18 to dislodge material from the discharge electrodes; said hammers being formed as sliding bars, usually held up by projection 19', thereon engaging with the top of a casing 31 but capable of being passed through a slot 32 in said top when the bar is turned to a certain position. (See Fig. 4.)

The several chambers "$a$," "$c$," "$d$" and "$e$" are preferably provided with sloping floors draining to outlet launder 24 for conducting away the collected sludge.

The several walls 14 and 16 in the humidifying and cooling chamber "$b$" and the electrical precipitating chambers "$c$", "$d$", etc., are preferably of reinforced concrete tapering toward the top, the outside walls of the flue 1 being also preferably of reinforced concrete and the floors thereof being of similar material, so that the entire structure, including the curtain walls or partitions 7 and 10 aforesaid forms a monolithic structure. The spaces between the tops of the respective walls may be closed by roof plates or covers 28 which have down-turned flanges 28' seated in horizontal channels 27 in the top of said walls. Water or solution supply launders 29 fed by pipes 25 are provided with branches 29' leading to the respective launders 27 so as to distribute water to said launders 27, the water flowing over the adjustable overflow plates 30 of said launder 27.

I have also shown in connection with the apparatus above described evaporating means consisting of a pan 34 located at the top of the vertical flue portion 35 directly adjacent to the inlet dampers 5. Preceding said vertical flue portion the inlet flue 35 may be provided with a horizontal portion 36 in which more or less settlement of the heavier dust may take place, such dust being removed by suitable means such as screw conveyors 37 feeding to a screw conveyor 38.

The above described apparatus may take hot gases from any furnace, such as a rotary kiln 41 for burning cement, said kiln being connected to a stack base 42 by a joint 43 preventing, as far as possible, admission of outside air. In the normal operation of the apparatus the stack 44 is shut off by a damper 44'.

The discharge electrodes 17 may be connected by wire to a source of high potential unidirectional current, as in Patent No. 1,200,887 granted to me October 10th, 1916.

The method of treating the gases in the above described apparatus is as follows:

The gases pass from a furnace or kiln 41 through stack base 42 to the settling flue 36, wherein coarser dust settles and is removed by means 37. The hot gases then pass in heating relation to the evaporating means 34, which may be adapted to remove considerable of the heat from the gases. The gases then pass through the spray chamber "a" wherein they are more or less completely saturated with water vapor by sprays from nozzles 12. The gases then pass between the plates or walls 14 and in contact with the streams of water or solution flowing down each wall. One effect of such contact of the hot gases with the comparatively cool water or solution is to cool the gases and thereby cause more or less condensation of the water vapor to form a cloud, or at least to reduce the temperature about to the dew point, so as to ensure water condensation in the following stage of the operation.

Another effect of the exposure of the hot gases to the water spray and to the downwardly flowing streams of water is to wash out more or less of the coarse dust or relatively large particles suspended in the gases and such material so washed from the gases accumulates in the bottom part of chambers "a" and "b" and drains away through outlet launder 24 corresponding to those chambers.

This washing action is effected (1st) by the direct washing action of the spray; (2nd) by the washing action due to condensation of water vapor on the dust particles, and the settling of the wet particles to the bottom of the chamber, and, (3rd) to the direct absorption of the dust particles in the descending streams or bodies of liquid.

The gas from which the coarse dust has been removed as above described then passes through the electrical precipitating chambers "c", "d", etc., wherein it is subjected to the action of electrical fields precipitated between the discharge electrodes 17 and the collecting electrodes 16 with the result that the fume or finer suspended matter in the gas is separated from the gas and collected in the stream or body of liquid flowing down each of the collecting electrodes.

The liquid and material collected thereby accumulates in the lower part of the precipitating chamber and drains away through the corresponding outlet launders 24. The sludge or mixture of solids and liquids draining through the several launders 24 may be treated in any suitable manner for recovering constituents of value therefrom, for example, the liquid may be treated by decantation, or filtration and evaporation (in the evaporating pans 34, or otherwise) so as to recover solubles contained in the liquid. In the case of the fume collected from cement kiln gas such solubles will consist largely of potassium compound. The cleaned gases pass from the final electrical precipitator through the stack 3, the blower 3' being employed, if necessary, to produce a forced draft. In view of the effective cooling of the gases in the process above described, forced draft will generally be necessary to insure effective operation.

In applying my invention for the collection of fume in dry condition the apparatus shown in Fig. 6 may be used, such apparatus comprising means for utilizing heat of the furnace gases in heating the boiler, a spray chamber for cooling and humidifying the gases after they have passed through the boiler, and an electrical precipitator for precipitating the fumes from the gases after they have passed through the spray chamber. In this figure I have shown my invention as applied to the collection of dust and fume from gases passing from a rotary cement kiln, such kiln being indicated at 41 and being, for example, connected to stack base 42 by a joint indicated at 43 adapted to reduce to a minimum the amount of air passing in at such joint. The stack 44 may be normally closed during the operation of the apparatus by damper means indicated at 44' so as to force the gases to pass through outlet 45 to the boiler chamber 46. A steam boiler indicated at 47 is enclosed in said boiler chamber and is adapted to be heated by gases passing therethrough, said gases being drawn from the chamber 46 by a fan 48 which forces the gases into the spray chamber 49, whose outlet 51 is connected to the electrical precipitator 52. Spray chamber 49 is provided with spray nozzles 50 for distributing water therein, preferably in atomized condition, and with drainage or outlet means 60 for carrying away the sludge or mixture of solids and liquids collected in the spray chamber.

The electrical precipitator 52 may be of any suitable construction comprising, for example, vertical pipes 53 mounted on a lower header 54 and connected at their upper ends to an upper header 55 leading to stack 56. Discharge electrodes 57 formed as wires or otherwise are mounted in vertical pipes 53 and supported on an insulated frame 58 connected by wire 59 to a suitable source of high tension unidirectional current substantially as above described. Suitable means indicated at 61 may be provided in the lower header 54 for carrying away the precipitated material and the vertical pipes 53 which operate as collecting electrodes for the fume are provided with suitable means for discharging the precipitated material therefrom so as to cause it to fall into the lower header. For this purpose jarring or knocking devices 62 may be provided, consisting of hammer levers adapted to strike the outside of the vertical pipes and operated in any suitable manner.

In carrying out my invention in the apparatus shown in Fig. 6, the gases are drawn from kiln 41 through the stack base 2, with a minimum of dilution at the nearly closed joint 43, thereby maintaining the volume of gas at a minimum. Some of its coarse dust may be collected in this stack base. The gases then pass through the spray chamber 49, wherein they are subjected to the action of water sprays or atomized liquid produced by spray devices 50, these sprays serving to cool the gases and to humidify the same, and also, to a large extent, to remove from the gases dust or solid suspended matter, other than fume, upon which washing operations have little effect. In the case of gases from cement kilns using potassium raw mix, the fume is relatively rich in potassium, whereas the coarser material washed out of the gases in the spray chamber is relatively poor in potassium. The sludge accumulating in the bottom part of chamber 49 may be discharged through outlet means 60 and, if desirable, may be treated by filtration and evaporation or otherwise for recovery of such solubles as it may contain. The gases pass from chamber 49 to the electrical precipitator, wherein the fume is precipitated and the precipitate is collected in the lower header and is removed by means 61. The gases are cooled and humidified or saturated with water vapor in the spray chamber to such an extent that the deposit on the collecting electrodes contains sufficient moisture (condensed from the saturated gases or precipitated along with the fume) to render it conducting, thereby obviating the disadvantageous effects of a non-conducting deposit as regards the electrical precipitating operation. It is desirable, however, in many cases, to collect the dust in a "dry" condition, that is, without sufficient moisture to cause it to set, or to form a mud or sludge, and in such cases only enough moisture will be supplied to ensure this result. In other cases, sufficient moisture may be supplied in the spray chamber and subsequently condensed and precipitated with the fume to form a sludge which may be drawn off and treated for recovery of solubles. In most cases, the cooling of the gases in the spray chamber and in the electrical precipitator and the connections thereof, should be such as to reduce the temperature below 100° C. and preferably below the dew point of the gas. This, in addition to the effect on electrical conductivity of the precipitated material, has the advantage of reducing the volume of gases to be treated, with corresponding reduction in the velocity obtained through the apparatus, and consequent greater efficiency of the separating operation in the spray chamber and electrical precipitator. Another important effect of the saturation of the gases with water vapor in the spray chamber is that in the subsequent cooling in the spray chamber the precipitator and the connections thereof, part of the water vapor condenses on the fume particles, the latter acting as nuclei of condensation, and the resulting particles are then more readily amenable to electrical precipitation and collection on account of their being of larger size than the usual fume particles, and being wet.

In some cases, the water may be distributed in the hot furnace gases in the form of steam, the subsequent cooling of the gases causing condensation of the water vapor and resultant washing of the gases, and such operation will effect some of the functions and advantages of my invention. In a broad sense, therefore, my invention includes the use of steam jets in substitution for the water sprays, either wholly or partially, as a means for distributing the water in the gases. But when cooling is an especially important consideration, the application of water in liquid form by water sprays is of especial advantage, as distinguished from the application of steam, as its cooling action is far more effective. Moreover, the use of steam is subject to the objection that it brings into the gas stream an additional amount of gas, diluting the gas and preventing to that extent the desired reduction in gas volume and velocity.

As a modification of the process the gases from the furnace may be treated in the apparatus shown in Fig. 7 passing first through the spray chamber 49, then through the fan or blower 48, and then through a flue 66 in condenser tank 64, wherein they are subject to cooling action by contact with tubes 65 containing water or solution. Such solution may be drawn by a pump 67 and piping 67' from a sump 68 to which drains the sludge collecting in spray chamber 49. The concentrated liquid may be drawn off through pipe 63. The gases cleaned of coarse dust and cooled, humidified about to saturation in the spray chamber are further cooled in passing through tank 64 so that a portion of the water vapor therein is condensed and accumulated, together with a portion of the dust and fume contained in the gases, in suitable drainage and discharging means 69. The gases then pass to the electrical precipitator 52 of the form above described, or of other suitable construction, wherein the fume is precipitated, together with sufficient moisture (resulting from the preceding humidifying and cooling operations described) to ensure the required conductivity of the precipitated deposit on the collecting electrodes.

In some cases it will be sufficient to provide (as shown in Fig. 8) a spray chamber 49, substantially as above described, followed by an electrical precipitator 52'. The electrical precipitator in this case is shown as of the plate type, comprising vertical collecting electrodes formed as plates 71 hung from the top of a casing or chamber 72, and the discharge electrodes formed as vertical wires 73 being from an insulated support 74 connected by wire 75 to a wire of unidirectional high tension current. The material precipitated on the collecting electrodes 71 may be dislodged therefrom by hammer means 76 and may be carried away by conveyor means 77 or otherwise collected. The sludge collecting in the spray chamber 49 may be carried away by suitable means such as conveyor 78. The fan or blower 48 draws the gases through the apparatus described, such gases being drawn from a furnace stack or flue 45'.

In carrying out the process in the apparatus shown in Figs. 6, 7 and 8, I prefer to so maintain the conditions in the apparatus that the fume which is precipitated in the electrical precipitator does not contain sufficient water to form a sludge or to cause it to cake (in the case of cement kiln dust) but only sufficient moisture to render it slightly conducting and thus prevent the accumulation of electric charges therein, which would interfere with the operation of the precipitator. The fume will, therefore, be collected in so called "dry" condition, as distinguished from collection as a sludge.

The amount of water supplied to the hot gases should, in any case, be sufficient to enable effective precipitation in the electrical precipitating apparatus. In general, this will be best effected by producing conditions leading to presence of moisture in the deposit on the electrodes, but in some cases it is not necessary that such moisture be present, in the deposit, provided the gases be suitably humidified.

What I claim is:

1. The process of separating dust and fume from hot furnace gases which consists in distributing water in finely divided condition in such gases, then passing the gases in contact with descending streams of water, collecting and removing the material washed from the gases by the water sprays and the descending streams of water and then passing the gases through electrical fields maintained adjacent to the descending streams of water so as to precipitate fume into such descending streams of water and thereby collecting the fume separate from the material collected in the first part of the process.

2. The process of separating suspended dust and fume from hot gases which consists in subjecting the hot gases to the action of water sprays to remove coarse dust and cool and humidify the gases connecting the dust so removed from the gases and thereafter passing the gases through electrical fields in contact with descending bodies of water so as to collect the fume in such bodies of water separately from the dust previously removed from the gases.

3. The process of separating dust and fume from hot furnace gases which consists in first cooling the gases by contact with heat absorbing and utilizing apparatus, then subjecting the gases to the action of water sprays to further cool the gases and humidify the same and to remove relatively coarse dust from the gases collecting the dust so removed from the gases and then subjecting the gases to electrical precipitating action to precipitate and collect relatively fine fume separately from the dust previously removed from the gases.

4. An apparatus for separating dust and fume from hot furnace gases comprising heat interchanging means for utilizing the heat of the gases for heating the liquid and at the same time partly cooling the gases, a spray chamber connected to receive the gases so partially cooled and provided with spray means for spraying the liquid in the gases to further cool and humidify the same and to wash out relatively coarse dust from the gases, said spray chamber being provided with means for the removal of liquid and solid materials accumulated therein, means for receiving the gases from said spray chamber and adapted to further cool the gases and to utilize the heat withdrawn from the gases, and an electrical precipitator connected to receive the gases after such further cooling and adapted to precipitate fume from the gases by electrical action and provided with means for removing precipitated material therefrom separately from the material removed from the spray chamber.

5. An apparatus for separating suspended material from gases, comprising a chamber provided with means for passing the gases therethrough and with means for humidifying the gases; a chamber adapted to receive the gases from the first named chamber and provided with vertical walls extending parallel to the path of the gases through said chamber and with means for supplying liquid to said walls in such a manner as to cause the liquid to flow over surface of said walls in contact with the gases passing through said chamber to further humidify and cool the gases and to remove from the gases relatively coarse material suspended therein, said chamber being provided with means for collecting the material so removed from the gases and a chamber adapted to receive the gases from said second named chamber and provided with means for producing this charge of electricity into the gases and electrical precipitation of the suspended material from the gases and said last named chamber being provided with means for collecting the material precipitated therein separately from the material collected in the preceding chamber.

6. An apparatus for separating suspended material from gases comprising a spray chamber adapted to receive the gases and provided with means for spraying water into the gases; a chamber connected to receive the gases from said spray chamber and provided with vertical walls extending parallel to the path of the gases through said chamber and means for supplying liquid to said walls in such manner as to cause the liquid to flow over surface of the said walls in contact with the gases and an electrical precipitator chamber connected to receive gases from the second named chamber and provided with collecting electrodes and discharge electrodes and means for maintaining said electrodes at sufficient potential difference to cause electrical precipitation of the suspended material from the gases, each of said chambers being provided with means for separate collection of the material removed from the gases while passing through such chamber.

7. An apparatus for separating suspended material from gases comprising a flue adapted to receive the gases and provided with means for receiving and removing heavy suspended material settling out by gravity; a chamber connected to receive the gases from said flue and provided with means for spraying liquid into the gases to cool and humidify the gases and wash out some of the suspended material therefrom; a chamber connected to receive the gases from said first named chamber and provided with series of vertical walls extending parallel to the path of the gases through said chamber and means for causing liquid to flow over said walls to further cool and humidify the gases and remove a further amount of suspended material therefrom; and an electrical precipitator chamber connected to receive the gases from said last named chamber and provided with means for electrical precipitation of remaining suspended material, the gases including particles of condensed liquid produced by the humidifying and cooling actions in the preceding chambers.

In testimony whereof I have hereunto subscribed my name this 31st day of July, 1918.

WALTER A. SCHMIDT.